(12) United States Patent
Lashmore et al.

(10) Patent No.: US 7,611,579 B2
(45) Date of Patent: Nov. 3, 2009

(54) SYSTEMS AND METHODS FOR SYNTHESIS OF EXTENDED LENGTH NANOSTRUCTURES

(75) Inventors: David Lashmore, Lebanon, NH (US); Joseph J. Brown, Norwich, VT (US); Robert C. Dean, Jr., Norwich, VT (US); Peter L. Antoinette, Nashua, NH (US)

(73) Assignee: Nanocomp Technologies, Inc., Concord, NH (US)

( * ) Notice: Subject to any disclaimer, the term of this patent is extended or adjusted under 35 U.S.C. 154(b) by 262 days.

(21) Appl. No.: 11/035,471

(22) Filed: Jan. 14, 2005

(65) Prior Publication Data

US 2005/0170089 A1    Aug. 4, 2005

Related U.S. Application Data

(60) Provisional application No. 60/536,767, filed on Jan. 15, 2004.

(51) Int. Cl.
C30B 23/00 (2006.01)
C30B 28/12 (2006.01)
H01L 21/322 (2006.01)
C03C 17/00 (2006.01)

(52) U.S. Cl. .................. 117/84; 117/105; 117/106; 117/109; 117/921; 438/477; 438/770; 438/909; 977/700; 977/701; 977/702; 977/844; 977/890; 977/963; 65/31

(58) Field of Classification Search .............. 117/105, 117/84, 106, 109, 921; 977/700, 701, 702, 977/844, 890, 963; 438/477, 770, 909; 65/30, 65/13, 31, 32, 4

See application file for complete search history.

(56) References Cited

U.S. PATENT DOCUMENTS

| | | | | |
|---|---|---|---|---|
| 3,600,147 | A | * | 8/1971 | Cohen et al. ............... 65/31 |
| 4,521,236 | A | * | 6/1985 | Yamamoto et al. ........... 65/31 |
| 5,871,650 | A | * | 2/1999 | Lai et al. ................. 210/653 |
| 5,998,328 | A | * | 12/1999 | Dawes et al. ............. 502/182 |
| 6,036,774 | A | * | 3/2000 | Lieber et al. ............. 117/105 |
| 6,673,136 | B2 | * | 1/2004 | Gillingham et al. ......... 95/273 |
| 2002/0113335 | A1 | * | 8/2002 | Lobovsky et al. .......... 264/184 |
| 2003/0165648 | A1 | * | 9/2003 | Lobovsky et al. .......... 428/36.9 |
| 2003/0222015 | A1 | * | 12/2003 | Oyama et al. ........... 210/500.21 |

(Continued)

OTHER PUBLICATIONS

PCT International Search Report based on PCT/US05/01242, dated Sep. 21, 2006.

(Continued)

*Primary Examiner*—Robert M Kunemund
*Assistant Examiner*—G. Nagesh Rao
(74) *Attorney, Agent, or Firm*—Chinh H. Pham; Greenberg Traurig, LLP (57) ABSTRACT

A system for synthesizing nanostructures using chemical vapor deposition (CVD) is provided. The system includes a housing, a porous substrate within the housing, and on a downstream surface of the substrate, a plurality of catalyst particles from which nanostructures can be synthesized upon interaction with a reaction gas moving through the porous substrate. Electrodes may be provided to generate an electric field to support the nanostructures during growth. A method for synthesizing extended length nanostructures is also provided. The nanostructures are useful as heat conductors, heat sinks, windings for electric motors, solenoid, transformers, for making fabric, protective armor, as well as other applications.

28 Claims, 8 Drawing Sheets

U.S. PATENT DOCUMENTS

| | | | |
|---|---|---|---|
| 2004/0096389 A1* | 5/2004 | Lobovsky et al. | 423/447.1 |
| 2005/0006801 A1* | 1/2005 | Kinloch et al. | 264/5 |
| 2005/0074569 A1* | 4/2005 | Lobovsky et al. | 428/36.9 |
| 2005/0170089 A1* | 8/2005 | Lashmore et al. | 427/248.1 |
| 2006/0137567 A1* | 6/2006 | Yadav | 106/31.9 |
| 2008/0014431 A1* | 1/2008 | Lashmore et al. | 428/315.5 |
| 2008/0038492 A1* | 2/2008 | Huang et al. | 428/34.1 |

OTHER PUBLICATIONS

R.T.K. Baker et al., "*Nucleation and Growth of Carbon Deposits from the Nickel Catalyzed Decomposition of Acetylene*", Journal of Catalysis, 26:51-62 (1972).

T.K. Baker et al. "*Formation of Filamentous Carbon from Iron, Cobalt and Chromium Catalyzed Decomposition of Acetylene*", Journal of Catalysis, 30:86-95 (1973).

Maarroufi A et al., "*Magnetic Anisotropy of Graphite and Electronic Energy Band Parameters*", The Journal of Physics and Chemistry of Solids, 43(12):1103-450 (1982).

H.W. Kroto et al., "$C_{60}$: *Buckminsterfullerene*", Letters to Nature, 318:162-163, (1985).

Sumio Iijima, "*Helical microtubules of graphitic carbon*", Letters to Nature, 354:56-58, (1991).

M.A. Kim et al., "*The Interaction of Hydrocarbons with Copper-Nickel and Nickel in the Formation of Carbon Filaments*", Journal of Catalysis, 131(1):60-73 (1991).

D.S. Bethune et al., *Cobalt-catalyzed growth of carbon nanotubes with single-atomic-layer walls*, Letters to Nature, 363:605-607 (1993).

N. M. Rodriguez, "*A review of catalytically grown carbon nanofibers*", Materials Research Society, 8(12):3233-3250 (1993).

M. Jose-Yacaman et al., "*Catalytic growth of carbon microtubules with fullerene structure*", Applied Physics Letters, 62(6):657-659 (1993).

Gun-Do Lee et al, "*Catalytic decomposition of acetylene on Fe(001): A first-principles study*", The American Physical Society, Physical Review B66 081403R:1-4 (2002).

N. Seo Kim et al., "*Dependence of the Vertically Aligned Growth of Carbon Nanotubes on the Catalysts*", The Journal of Physical Chemistry, 106(36):9286-9290 (2002).

H. W. Zhu et al., "*Direct Synthesis of Long Single-Walled Carbon Nanotube Strands*", Science, 296:884-886 (2002).

Ki-Hong Lee et al., "*Control of growth orientation for carbon nanotubes*", Applied Physics Letters, 82(3): 448-450, (2003).

E. F. Kukovitsky et al., "*CVD growth of carbon nanotube films on nickel substrates*", Applied Surface Science, 215:201-208 (2003).

T. K. Baker, "*Graphite Nanofibers and Nanotubes-Catalytically Engineered Materials*", Jones Lecture at Dartmouth College, 2003.

* cited by examiner

SYSTEMS AND METHODS FOR SYNTHESIS OF EXTENDED LENGTH NANOSTRUCTURES

RELATED U.S. APPLICATION(S)

This application claims priority to Provisional Application Ser. No. 60/536,767, filed Jan. 15, 2004, which application is hereby incorporated herein by reference.

FIELD OF THE INVENTION

The present invention relates to the synthesis of nanostructures, and more particularly, to the use of chemical vapor deposition (CVD) for the synthesis of such nanostructures.

RELATED ART

Carbon nanotubes have been known for some time. Examples of literature disclosing carbon nanotubes include, J. Catalysis, 37, 101 (1975); Journal of Crystal Growth 32, 35 (1976); "Formation of Filamentous Carbon", Chemistry of Physics of Carbon, ed. Philip L. Walker, Jr. and Peter Thrower, Vol. 14, Marcel Dekker, Inc, New York and Basel, 1978; and U.S. Pat. No. 4,663,230, issued Dec. 6, 1984. More recent interest in carbon filamentary material was stimulated by a paper by Sumio Iijima in Nature 354, 56 (1991) describing a similar material. These early studies and the work that has developed from these studies resulted in a material with remarkable mechanical and electronic properties. However, the nanotubes that these studies produced have been short and are limited for composite material reinforcement, where longer tubes may be necessary to get good load transfer from tube to tube.

Some reports of long carbon nanotubes have appeared in the literature, whereby the nanotubes are grown via chemical-vapor deposition (CVD) processes. There are typically two growth modes using CVD. In "tip growth", nanotubes may be grown from catalytic particles suspended in a reaction gas, which serves as a feedstock for carbon. In this approach, if the nanotube is bonded to a substrate, the catalyst particle moves farther from the substrate as the nanotube grows. Alternatively, a catalyst particle may be embedded in a nanotube fiber that grows in two directions from the particle. In a second mode, "base growth", the catalyst particle itself is bonded to a substrate, and the nanotube fiber that grows from this particle increases in length. Base growth is typically performed on solid, non-porous substrates. Thus, diffusion of feedstock gas to the catalytic particle can become limited as a forest of nanotube fibers grows from a collection of catalytic particles on the substrate. The growing forest of fibers can create an obstruction of gas flow to the catalyst base, and can eventually limit the length of the nanotubes. Lengths of nanotubes grown with these techniques are typically about 100 microns to 500 microns long.

In addition, unlike carbon nanotubes, little is known about the growth of periodic or aperiodic (carbon) prismatic structures. Carbon structures resembling "horns", which likely have been patterned by odd-shaped regions of catalyst, have been observed in SEM images. Nevertheless, it is believed that synthesis of prismatic structures having continuous graphene walls from a designed pattern has not been possible.

Accordingly, it would be desirable to synthesize extended length nanostructures whereby there is minimal contamination to the nanostructures, whereby there is substantially no limit to the length of the nanostructures, and whereby the shape of the nanostructures can be specifically patterned.

SUMMARY OF THE INVENTION

The present invention provides, in an embodiment, a system for synthesizing nanostructures. The system includes a housing having a first end, an opposite second end, and a passageway extending between the first and second end. The system also includes a porous substrate situated within the passageway of the housing, and having an upstream surface and a downstream surface. A plurality of catalyst particles can be provided on the downstream surface of the substrate, and from which nanostructures can be synthesized upon interaction with a reaction gas. A heating mechanism may be placed circumferentially about the substrate for generating energy sufficient to maintain an environment within which nanostructures can be synthesized. A pair of flanges may be provided, each capping one end of the housing. An inlet may be positioned across the flange capping the first end of the housing for introducing reaction gas to the porous substrate. An exhaust port may be provided across the flange capping the second end of the housing for exhausting the reaction waste product. In one embodiment, a tube may be provided within the passageway of the housing to accommodate the porous substrate. In addition, a pair of electrodes may be provided, such that the substrate is situated therebetween to generate an electric field to support the nanostructures during growth. Alternatively, one electrode may be provided to accommodate the substrate concentrically therein. In this embodiment, the substrate may act as a second electrode. A mechanism may also be provided for collecting the grown nanostructures.

The present invention also provides, in one embodiment, a substrate for the synthesis of nanostructures. The substrate includes a porous body having an upstream surface and a downstream surface. The substrate further includes a plurality of catalyst particles deposited on the downstream surface of the substrate, and from which nanostructures may be synthesized. The porosity of the body provides pathways through which a reaction gas can travel across the upstream surface and out the downstream surface to initiate growth of nanostructures from the catalyst particles. The substrate, in one embodiment, may be provided with pore size ranging from about 0.5 nm to about 500 microns, and a void fraction of from about 10 percent to about 95 percent. The catalyst particles on the substrate may range from about 1 nm to about 50 nm.

The present invention further provides, in one embodiment, a method for synthesizing nanostructures. The method includes, providing a porous substrate having an upstream surface and a downstream surface. Next, a plurality of catalyst particles may be deposited on to the downstream surface of the substrate. In one embodiment, the particles may be deposited directly onto the substrate by one of, precipitation of the particles solution, ball milling, sputtering, electrochemical reduction, or atomization. In another embodiment, the catalyst particles may be provided by chemical reduction of metallic salts deposited from solution and dried on to the substrate. In a further embodiment, catalyst particles may be provided by reduction of particles deposited from suspension and dried on to the substrate. In yet another embodiment, the catalyst particles may be provided by reduction of metallic salts deposited from solution and dried on to the substrate. The deposited catalyst particles, in an embodiment, may be distributed substantially evenly across the downstream surface of the substrate. Thereafter, a flow of reaction gas may be directed across the upstream surface and through the downstream surface of the substrate. The reaction gas may subsequently be permitted to decompose about the catalyst particles to generate constituent atoms. The atoms may then be allowed to diffuse onto the catalyst particles for synthesis of nanostructures therefrom. The method also provides an electric field generated from electrodes to support the nanostructures while they are growing, and a supply of evacuation gas to remove reaction waste product.

In another embodiment, the present invention provides a method for synthesizing prismatic structures. The method includes, providing a surface upon which a plurality of catalyst lines can be created. Next, catalyst lines can be generated on the surface, so as to form a designed pattern from which prismatic structures can be synthesized. Thereafter, a flow of reaction gas may be directed to the catalyst lines in the designed pattern. The reaction gas may subsequently be decomposed about the catalyst lines to generate constituent atoms. Diffusion of the constituent atoms may then be permitted onto the catalyst lines for the synthesis of prismatic structures. As diffusion occurs, planar carbon nanostructures (i.e., graphene planes) start to self-assemble from the lines of catalyst, in a direction perpendicular to that of the surface on which the catalyst lines are patterned. It should be noted that junctions of catalyst lines form junctions between graphene planes, and that continuous growth of the prismatic structure can occur, so long as reagent gas is continually supplied to the catalyst lines.

A method is further provided, in accordance with one embodiment of the present invention, for collecting nanostructures. The method includes, providing a cylindrical surface around which the nanostructures can be collected. As the cylindrical surface rotates, the speed at which it moves may be controlled to match the speed of the slow growing nanostructures. Next, the nanostructures growing from the substrate are caused to oscillate in parallel to an axis of the cylindrical surface with an amplitude sufficiently large to accommodate fast growing nanostructures on a sinuous path upon the cylindrical surface. Thereafter, the slow growing nanostructures may be laid down on circumferential loci of the cylindrical surface, while the fast growing nanostructures may be laid down on a sinuous locus of maximum amplitude.

The present invention also provides a material comprising at least one prismatic structure formed from a plurality of joined graphene planes, and the utilization of nanostructures and prismatic structures in various commercial applications.

DETAILED DESCRIPTION OF SPECIFIC EMBODIMENTS

The present invention, in one embodiment, is directed to the synthesis of nanostructures through the use of chemical vapor deposition (CVD). In particular, a carbon-containing gas may be directed through one surface of a porous substrate on to catalyst nanoparticles deposited on an opposite surface of the substrate to continuously grow nanostructures of extended length from the catalyst nanoparticles.

Figure 1:
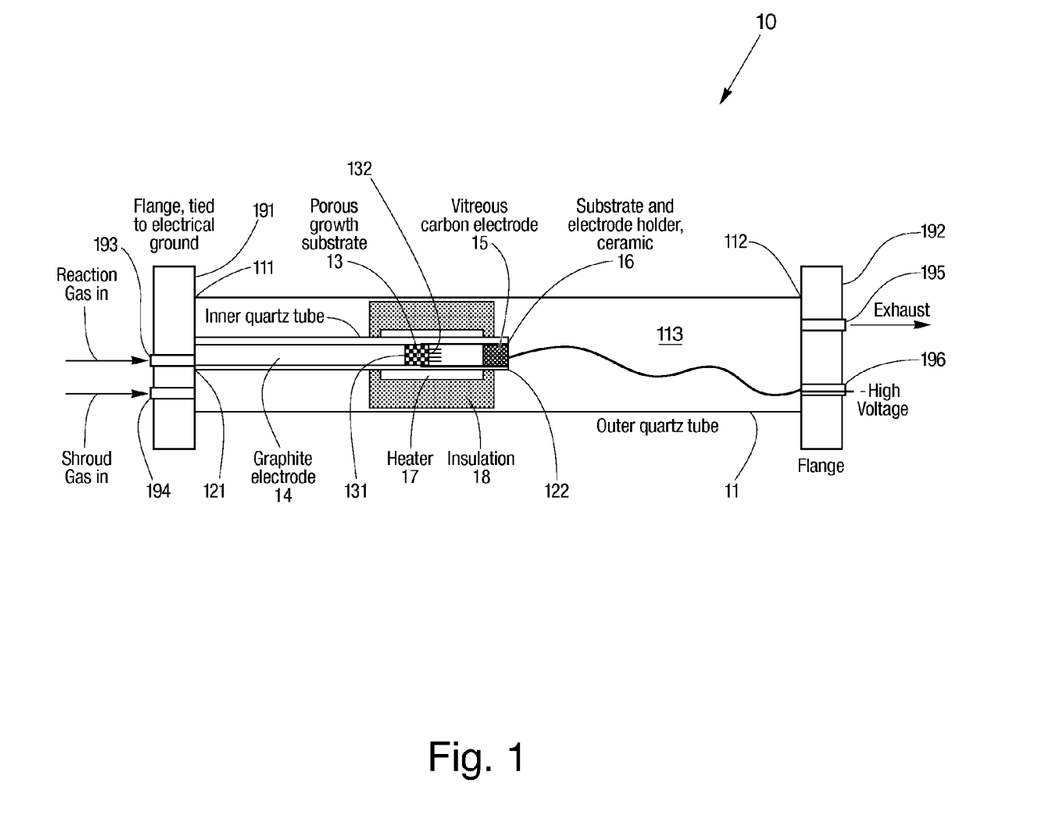
FIG. 1 illustrates, in accordance with one embodiment of the present invention, a system for the synthesis of extended length nanostructures.

Referring now to FIG. 1, there is shown a system 10 for the synthesis of nanostructures of extended length. The system 10, in one embodiment, includes housing 11 having opposite ends 111 and 112 and a passageway 113 extending between ends 111 and 112. A tube 12, within which extended length nanostructures may be generated, may be situated within the passageway 113 of housing 11. As shown in FIG. 1, one end 121 of tube 12 may be positioned in alignment with end 111 of housing 11, while an opposing end 122 of tube 12 extends toward end 112 of housing 11. As the housing 11 and tube 12 must withstand variations in temperature, gas-reactive environments, and other growth conditions, housing 11 and tube 12 may be manufactured from a strong, substantially gas-impermeable material that is substantially resistant to corrosion. In an embodiment, the housing 11 and tube 12 may be made from quartz. Of course, other materials may be used, so long as the housing 11 and tube 12 can remain impermeable to gas and maintain their non-reactive character. Also, although illustrated as being cylindrical in shape, housing 11 and tube 12 may be provided with any geometric cross-section.

Figure 2:
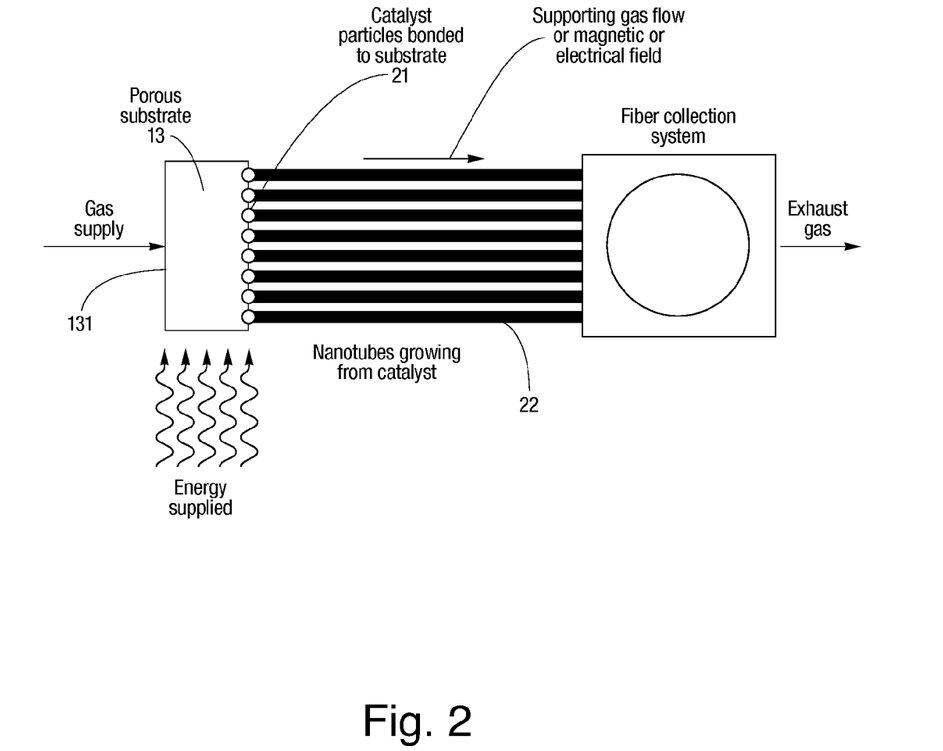
FIG. 2 illustrates an area within the system shown in FIG. 1 for growing extended length nanostructures.

The system 10 further includes a porous substrate 13. As illustrated in FIG. 2, substrate 13 may have deposited thereon catalyst particles 21, (e.g, spherical or elongated in shape), or for the synthesis of extended length nanostructures 22. The porous substrate 13, in one embodiment, may be positioned within tube 12 towards end 122, such that a carbon-containing gas (i.e., reaction gas) may be directed across an upstream surface 131 of the substrate 13 and out through a downstream surface 132 during the synthesis of extended length nanostructures 22. Accordingly, the substrate 13 may be made from a material sufficiently porous, so that a pressure difference between the upstream surface 131 and the downstream surface 132 can be substantially low, so as to maintain the structural integrity of the substrate 13 during the synthesis process. In one embodiment, substrate 13 may be cylindrical in shape to complement the interior of tube 12, and may be provided with pore size ranging from about 0.5 nm (nanometers) to about 500 microns, and preferably between about 20 nm and about 2000 nm. In addition, substrate 13 may have a void fraction of from about 10 percent to about 95 percent, and preferably of from about 50 percent to about 90 percent. Substrate 13 may alternatively be of any geometric shape, so long as it can be retained within tube 12 for the synthesis of extended length nanostructures 22.

Figure 3:
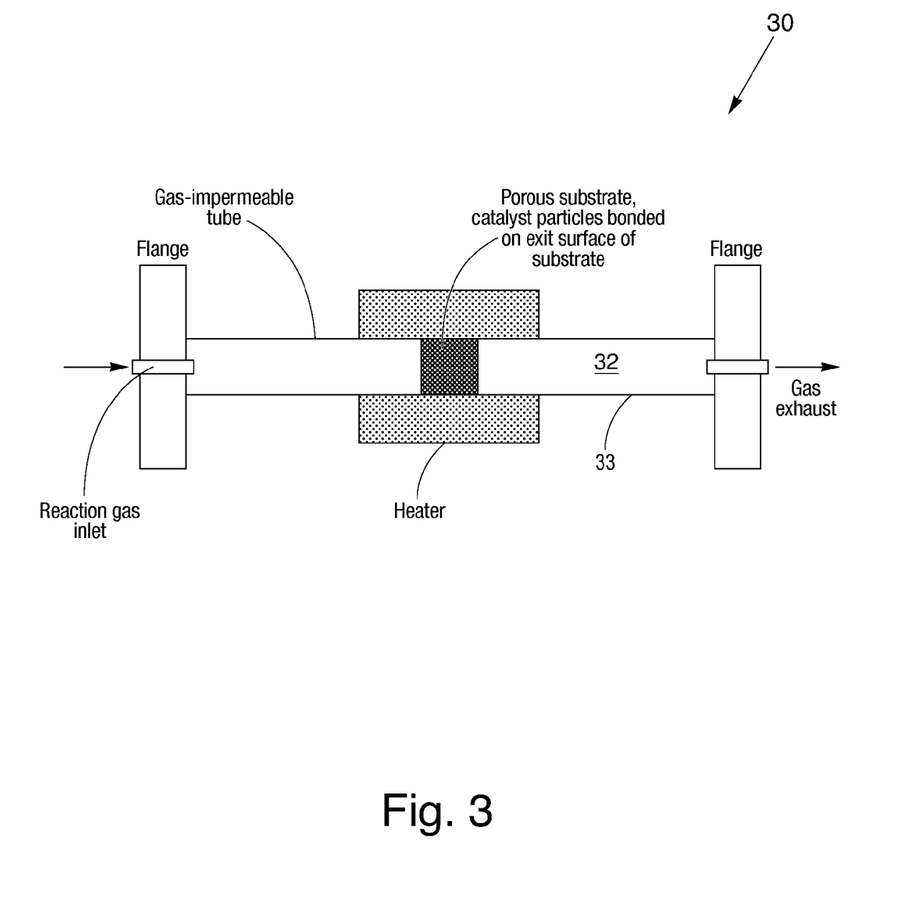
FIG. 3 illustrates a variation in the location of the heating mechanism for use in connection with the system illustrated in FIG. 1.

It should be appreciated that although the discussion provided hereinafter relates to the use of tube 12 with substrate 13 situated therein, the system 10 may be implemented without the use of tube 12. In such a system 30, as illustrated in FIG. 3, substrate 31 may be situated within the passageway 32 of housing 33.

As substrate 13 may provide a surface, e.g., downstream surface 132, on which catalyst particles 21 can be deposited, substrate 13 may preferably be made from a material that will permit the catalyst particles to securely bond thereto. Examples of such materials include carbon foams, glassy carbon foams, porous silica, porous alumina coated with silica, porous zirconia, zeolites, sintered titanium powder, or a combination thereof. Alternatively, the substrate material may include wool made from steel, iron, or cobalt, felts or foams made from silica, alumina, yttria, zirconia and the like, iron foil, fibers, cloth, or porous alumina formed from anodized aluminum.

The porous substrate 13, in another embodiment of the present invention, may also be a plate (not shown) containing micro and/or nanoscale channels through which the reaction gas may be directed. Such a plate may be composed of a catalytic metal, such as Ni, Fe, Co, or a combination thereof, with channels milled through the plate by methods known in the art, for instance, electrochemistry or electrical discharge milling. In one embodiment, such a plate may be coated with an inert material, for example, Cu, Ti, Si, alumina, or silica, on the upstream surface and the downstream surface, so that the only chemically active surfaces are the channels of catalytic material. Alternatively, the plate may itself be an inert material, for instance, Cu, Ti, Si, alumina, or silica, and a thin layer of a catalytically active material, for example, Fe, Ni, or Co, may line the channels via electrochemical interactions, physical vapor deposition, or sputtering.

The substrate 13, in a further embodiment, may be an array of needles made from Fe, Ni, Co, or a combination thereof.

For certain combinations of catalyst particles and substrate materials, for example, iron on alumina, a bonding agent, such as sulfur, may be used to promote the bonding of the catalyst particles to the substrate 13. To this end, a compound such as iron ammonium sulfate may be used as a catalyst source that introduces sulfur to the iron-alumina system. Similar chemicals, which contain sulfur combined with nickel or cobalt may also be used.

Catalyst particles 21, on the other hand, may be made from materials such as iron, iron alloy, nickel or cobalt, their oxides, their alloys, or compounds with other metals or ceramics. Alternatively, the catalyst particles may be made from metal oxides, such as $Fe_3O_4$, $Fe_2O_4$, or FeO, or similar oxides of cobalt or nickel, or a combination thereof.

In accordance with one embodiment of the present invention, metal catalyst particles ranging from between about 1 nm and about 50 nm may be deposited directly on the substrate 13 by precipitation of the particles from solution, from ball milling, sputtering, electrochemical reduction, atomization, or other similar metal particle fabrication technologies known in the art.

Alternatively, metal catalyst particles ranging from about 1 nm to about 50 nm may be generated by chemical reduction of metal salts deposited from solution and dried on to the substrate 13. Metal salts such as iron chloride, iron sulfate ($FeSO_4$), iron sulfamate ($FeNH_2SO_3$), ferrous ammonium sulfate and similar salts with nickel or cobalt may be used.

In another embodiment of the present invention, particles ranging from 1 nm to about 50 nm, may be generated by reduction of particles deposited from suspension on to the substrate 13. Examples of such particles include nano-particulate oxides, such as FeO, $Fe_2O_3$, and $Fe_3O_4$.

In a further embodiment, thermal reduction (i.e., calcinations) may be used to cause metallic salts, for instance, iron acetate, iron citrate, iron oxalate, and the like, to decompose at high temperatures to leave behind metal catalyst particles. These salts may also be deposited from aqueous solution, dried, then thermally treated.

In connection with each of the above embodiments, if the catalyst particles were to be formed from deposition of ferromagnetic particles, such as Fe, Ni, Co, or $Fe_3O_4$, the application of a magnetic field greater than about 0.5 T in strength in the direction normal to the downstream surface 132 of the porous substrate 13 can be used to space the ferromagnetic particles 21 substantially evenly across the porous substrate 13. Once the catalyst particles have been substantially evenly distributed on the substrate 13, it may be necessary to bond the particles 21 to the substrate 13 to prevent further motion of the catalytic particles 21.

Referring again to FIG. 1, the system 10 further includes, within tube 12, electrode 14 upstream of the substrate 13 and electrode 15 downstream of the substrate 13. Upstream electrode 14 and downstream electrode 15 are positioned in such a manner so that an electric field may be generated to support the nanostructures being grown from the substrate 13, and to control and maintain the direction of growth of the nanostructures as they extend in length from the substrate 13. It should be appreciated that although the present invention contemplates the use of electrodes 14 and 15 as a physical support mechanism to the growing nanostructures, the system 10 may operate without these electrodes in the synthesis of extended length nanostructures.

The upstream electrode 14, in one embodiment, may be tubular in shape for placement along an interior surface of tube 12, and may extend from end 121 to substrate 13. The downstream electrode 15, on the other hand, may be cylindrical in shape to complement the interior of tube 12, and may be spatially positioned downstream of substrate 13 adjacent end 122. Downstream electrode 15 may also be porous, so as to permit the reaction gas exiting from the substrate 13 to pass through the electrode 15 and out of tube 12. In one embodiment, downstream electrode 15 may include a pore concentration of about 100 pores per inch. Moreover, similar to substrate 13, electrode 15 may be provided with any geometric shape, so long as it can be maintained within tube 12.

As electrodes 14 and 15 are used for generating an electric field, these electrodes may be made from an electrically conductive material. In addition, the material from which the electrodes may be made should be non-reactive and resistant to nanostructure growth to concentrate carbon deposition from the gas, and subsequent nanostructure growth at the catalyst particles, on the porous substrate. In particular, growth of nanostructures on the electrodes 14 and 15 can reduce the yield amount from the substrate 13 and can interfere with the optimal condition for synthesizing the nanostructures. To that end, the material from which electrodes 14 and 15 may be made can be graphite, copper, titanium, vitreous carbon or a combination thereof, or other conductors that are not catalytic to carbon nanostructure formation.

Downstream electrode 15, along with substrate 13, may be secured in place within tube 12 by holder 16. Holder 16, in one embodiment, may be inserted through end 122 of tube 12 and, from the perspective of FIG. 1, over electrode 15 and substrate 13. It should be appreciated that regardless of the design of the holder 16, holder 16 should be capable of permitting the reaction gas to exit through end 122 from tube 12. In an embodiment of the present invention, holder 16 may be made from an alumina (alumina)-silica ceramic material. However, any strong material that is substantially resistant to corrosion will be sufficient.

The system 10 further includes a heating mechanism 17 for maintaining the environment for generating the nanostructures within a specific temperature range (i.e., growth environment). The heating mechanism 17, in one embodiment, may be placed circumferentially about the tube 12 and over the downstream surface 132 of substrate 13 from which the nanostructures may be grown. Although illustrated in FIG. 1 as being positioned substantially over substrate 13, it should be appreciated that the heating mechanism 17 may be placed anywhere along the length of tube 12, so long as it is situated substantially over the downstream surface 132 of the substrate 13. The heating mechanism 17, in one embodiment, may deliver thermal energy to the growth environment. Accordingly, the heating mechanism 17, in an embodiment, may be made from NiCr wires, and in one contemplated embodiment, may be made from 26 gauge NiCr wires or wires of similar size. Of course, any other commercially available heating mechanism may be used in placed of the NiCr wires. Moreover, other than thermal energy, mechanisms that can generate, for instance, frictional energy, visible light photons or other types of electromagnetic radiation, chemical energy, electrical energy, or electrochemical energy, microwave radiation, eddy currents, ultrasound shock waves or compression, to the growth environment may also be used.

As the heating mechanism 17 must maintain the temperature environment within tube 12 to within a specified range during the synthesis of the nanostructures, although not illustrated, the system 10 may be provided with a thermocouple, for instance, on the exterior of tube 12 near the heating mechanism 17, to monitor the temperature environment adjacent the downstream surface 132 of substrate 13. In an embodiment, the maintenance of temperature environment within tube 12 adjacent substrate 13 may be further optimized by the use of an insulating structure 18 about the heating mechanism 17. The placement of insulating structure 18 thereat may also assist in the securing of the heating mechanism 17 about the tube 12. The insulating structure, in one embodiment, may be made from, for example, zirconia ceramic fibers. Other insulating materials may, of course, also be used.

Still referring to FIG. 1, the system 10 may be provided with caps, such as flange 191 for sealing end 111 of housing 11 and flange 192 sealing end 112 of housing 11. Capping flange 191, in one embodiment, provides a surface to which end 121 of tube 12 and upstream electrode 14 may attach. The placement of flange 191 at end 112 further permits flange 191 to act as an electrical ground for upstream electrode 14. As illustrated in FIG. 1, capping flange 191 includes inlets 193 and 194, while capping flange 192 includes an exhaust port 195 and port 196. Because these flanges can be exposed to various gases and a range of temperatures during the synthesis process, the flanges, in an embodiment, may be made from a strong, substantially gas-impermeable, solid material, for instance, stainless steel, that can withstand variations in temperature, while remaining substantially resistant to corrosion.

Inlet 193, in one embodiment, may be substantially aligned with tube 12, so as to provide a pathway through which a flow of reaction gas may be introduced into the interior of tube 12 to substrate 13. The reaction gas, which will be discussed hereinafter in further detail, may be a mixture of $H_2$ and an inert gas, for instance, He, Ar, etc., to which a carbon-containing source, such as ethanol, methane, or acetylene, may be added at a controlled rate prior to being introduced into tube 12.

Inlet 194, on the other hand, provides a pathway through which a supply of an evacuation gas may be introduced into the passageway 113 of housing 11. The evacuation gas, in one embodiment, may be a mixture of $H_2$ and an inert gas, such as He, Ar, etc. The introduction an evacuation gas into housing 11 can act to displace and remove oxygen from within the housing 11. It should be appreciated that the presence of significant amounts of oxygen within the system 10 can decrease the productivity of the system. The introduction of evacuation gas into the housing 11 can also act to displace and remove, through exhaust port 195, reaction waste product flowing from the substrate 13 exiting from tube 12.

Exhaust port 195, in accordance with one embodiment of the present invention, may be connected to an exhaust pipe (not shown) that is fitted with a check valve (i.e., one-way valve) to prevent gases exhausting through port 195 from flowing back into housing 11.

Additional ports can be provided in flange 191 in order to create passages through which electrical wires may be fed to power the heating mechanism 17 and the thermocouple (not shown). Port 196, similarly, provides a passage through which electrical wire 197 may extend to the downstream electrode 15. Electrical wires extending through the additional ports in flange 191, as well as through port 196, in one embodiment, can include sufficient insulation to seal the ports and to prevent any leakage of gases therethrough. The wire insulation may also act to prevent the electrical wires from making an electrical connection with flanges 191 and 192.

Figure 4A:
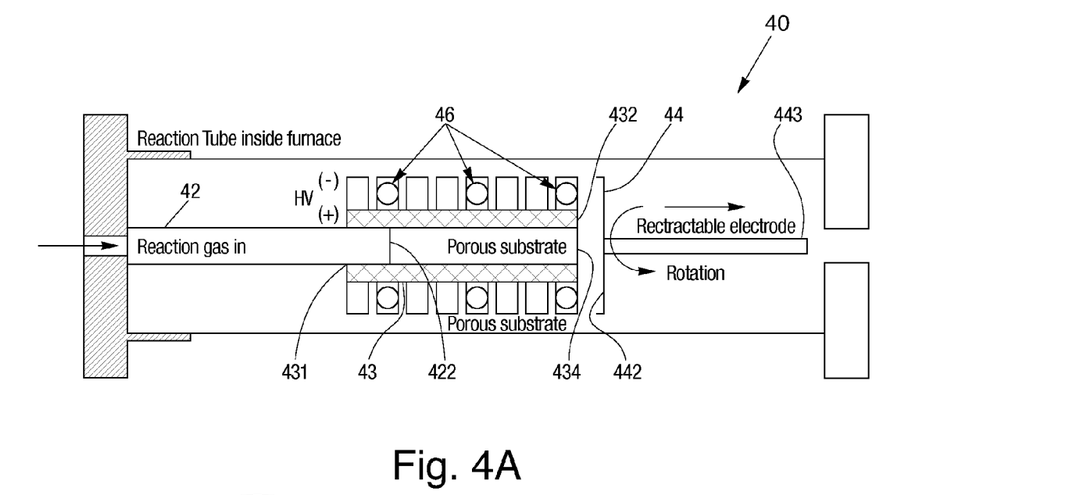
FIGS. 4A and B illustrate, in accordance with another embodiment of the present invention, a system for the synthesis of extended length nanostructures.
Figure 4B:
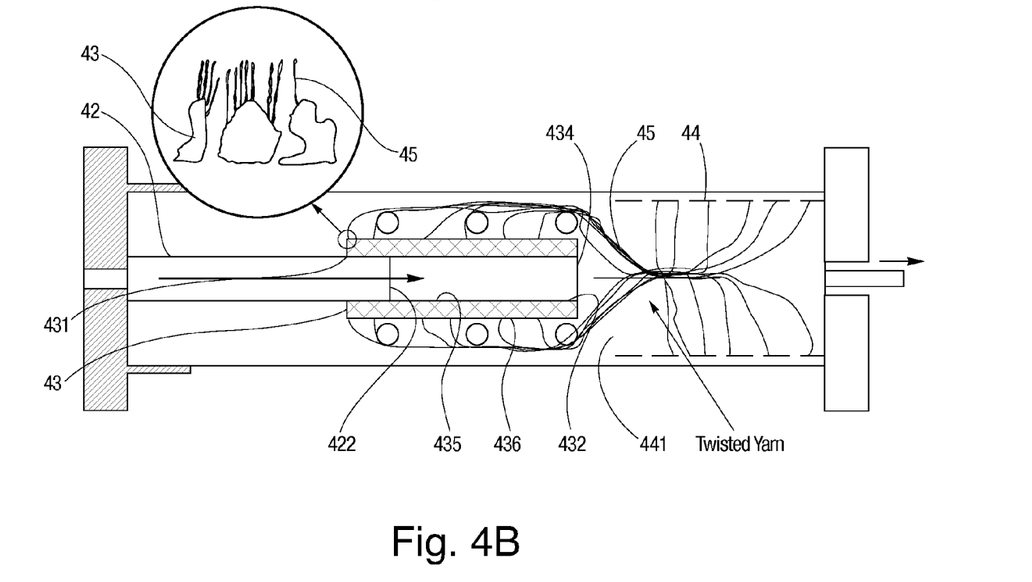

Looking now at FIGS. 4A and B, there is illustrated, in accordance with another embodiment of the present invention, a system 40 for the synthesis of extended length nanostructures. System 40, as shown, is substantially similar to system 10 with the exception of porous substrate 43, which may act as an electrode. Substrate 43, along with counter-electrode 44, can act to generate an electrostatic field therebetween for physical support of the extended length nanostructures 45 during growth. Furthermore, whereas system 10 provides a linear arrangement between the substrate 13 and the electrodes 14 and 15, system 40 provides a concentric arrangement between the substrate 43 and the electrode 44.

In this embodiment, porous substrate 43, rather than being positioned within the interior of tube 42, i.e., the reaction gas passageway, may be tubular in shape so that it can be circumferentially positioned about an exterior surface of tube 42 towards end 422. Substrate 43 includes a first end 431 into which the end 422 of tube 42 may be placed. Substrate 43 also includes an opposite second end 432 to which a plug 434 may be provided. Although illustrated as tubular in shape, substrate 43 may be designed to have any geometric shape, so long as it can remain about the exterior of the tube 42. In connection with the design shown in FIGS. 4A and B, the reaction gas may exit from tube 42, across end 422, and in the presence of plug 434 at the second end 432 of substrate 43, be directed across an interior surface 435 of the substrate 43 and out through an exterior surface 436 during the synthesis of nanostructures 45. To that end, substrate 43 may be designed to be sufficiently porous, so that a pressure differential between the interior surface 435 and the exterior surface 436 can be substantially low so as to maintain the structural integrity of the substrate 43. In one embodiment, substrate 43 and may be provided with pore size ranging from about 0.5 nm to about 500 microns, and preferably between about 20 nm and about 2000 nm.

In addition, as substrate 43 may also act as an electrode while permitting catalyst particles 46 to be deposited thereon, substrate 43 may be made from an electrically conductive material, for example, copper, glassy carbon foams, porous titania, porous zirconia, iron carbide, sintered titanium powder, and the like. Alternatively, a conducting material may be placed behind the substrate 43. The substrate 43 may further be an inert material, such as porous alumina or silica, coated with a thin layer of an electrically conductive material, for instance, copper, tin oxide, titania, or titanium, and the like.

Counter-electrode 44, as illustrated in FIGS. 4A and B, may be tubular in shape and may include an open end 441 and a closed end 442. Electrode 44, in an embodiment, may be sufficiently sized so as to concentrically accommodate the substrate 43 through its open end 441. Electrode 44 may also include a stem 443 extending from the closed end 442. The stem 443 may be coupled to a motorized mechanism for rotating the electrode 44, while retracting the electrode 44, from the perspective of FIGS. 4A and B, from left to right. Stem 443 may also act as a guide for the retraction of electrode 44.

As electrode 44 may be used along with substrate 43 for generating an electric field, electrode 44 may be made from an electrically conductive material. To that end, the material from which electrode 44 may be made can be graphite, copper, titanium, titania, vitreous carbon or a combination thereof.

Still referring to FIGS. 4A and B, a plurality of cylindrical rings 46 may be positioned circumferentially about substrate 43 between electrode 44 and substrate 43. The cylindrical rings 46, in one embodiment, may be provided to act as guides during the growth of the extended length nanostructures 45. In particular, as the nanostructures 45 grow from the exterior surface 436 of substrate 43 and become attracted to counter-electrode 44 within the generated electrostatic field, retraction of the counter-electrode 44 tends to pull the nanostructures 45 over the cylindrical rings. By bending as they move past the rings 46, nanostructures can continue to grow, at their proximal portion (i.e., portion closest to the substrate), in a direction perpendicular to the surface of the substrate 43, while their distal portion is drawn away from the porous substrate 43. To minimize any interference with the growth of the extended length nanostructures 45 from the substrate 43, it should be noted that the cylindrical rings 46 may be spatially positioned above the substrate 43, rather than directly on the substrate 43.

With reference now to a process for synthesizing nanostructures, the present invention provides, in one embodiment, a process for generating nanotubes of extended length.

EXAMPLE I

Prior to initiating the synthesis process, a porous substrate needs to be provided on which there can be deposited a concentration of catalyst particles for growing extended length nanotubes of extended length.

Substrate and Formation of Catalyst Particles

The substrate, in one embodiment, may be a porous alumina foam having approximately 50 micron to 200 micron pores and an approximately 50% to 90% void fraction. It should be noted that the substrate may be formed from various different materials, so long as the substrate can be provided with pores size ranging between 5 nm and 500 microns, and void fractions ranging between 10% and 95%. The alumina foam may initially be cut to fit into a holder, such as holder 16 in FIG. 1. Next, catalyst particles may be deposited onto the downstream surface of the substrate.

In one embodiment, approximately 0.05 grams of commercially available Ni nanoparticles, about 5 nm in diameter, may initially be dispersed in about 10 mL $H_2O$ to make an aqueous suspension of the metal nanoparticles. The porous substrate may thereafter be soaked in this solution, and allowed to dry, with the downstream surface of the substrate facing upwards, for about 30 minutes at 110° C. It should be appreciated that the drying time may range from about 10 minutes to about 60 minutes at temperatures ranging from about 10° C. to about 200° C. Next, the substrate may be sealed within a tube, such as tube 12 in FIG. 1, into which reaction gas may be introduced during the synthesis process.

Specifically, the porous substrate may first be sealed in place in the holder. An adhesive capable of withstanding temperatures up to 1100° C., for instance, an alumina-based or zirconia-based ceramic cement, may be used. By using such a sealant, reaction gas may be prevented from leaking through between the perimeter of the substrate and the holder, and instead forced to pass through the upstream and downstream surfaces of the substrate. The holder and the substrate may then be placed within the tube, and the tube sealed circumferentially about the holder and substrate to prevent leakage of reaction gas. A downstream electrode, such as electrode 15 in FIG. 1, may be inserted within the holder and spatially situated downstream of the downstream surface of the porous substrate.

This assembled system may thereafter be exposed to hydrogen at approximately 850° C. to remove any residual oxidation that may reside on the surface of the deposited metal particles. This will ensure that a clean metallic catalyst surface will be provided before the nanotube growth reaction is allowed to proceed. Although 850° C. is used, temperature within a range of from about 350° C. to that near the melting point of the catalyst may be applied.

In a second embodiment, a 0.1 g/L to about 20 g/L, preferably 1 g/L, aqueous solution of $FeCl_2$, or a 0.01 N to about 1.0 N, preferably about 0.1 N, aqueous solution of ferrous ammonium sulfate ($Fe(NH_4)_2(SO_4)_2$) may be permeated through the porous substrate. The solution may then be allowed to dry, with the downstream surface of the substrate facing upwards, for about 30 minutes at 110° C. Again, the drying time may range from about 10 minutes to about 60 minutes at temperatures ranging from about 10° C. to about 200° C. As the salt solution dries, nanocrystallites of the solute may form on the surface of the porous substrate. The substrate may thereafter be sealed to provide the assembled system, as provided above, and exposed to hydrogen at approximately 850° C. for about 30 minutes to chemically reduce the salt nanocrystallites to metal nanoparticles. Although 850° C. is used, temperature within a range of from about 350° C. to about 1000° C. may be applied.

In a third embodiment, pre-formed nanoparticles of $Fe_2O_3$ may be used to define the desired catalyst particle size. Specifically, an amount of dry $Fe_2O_3$ nanoparticles, approximately 2 nm to 3 nm in diameter may be dispersed in $H_2O$ to form an aqueous saturated suspension. The suspension may then be sonicated with ultrasound for about 20 minutes to disperse the solid grains within the suspension. A surfactant may be used to enhance suspension of the particles in solution. After allowing the suspension to rest for about 20 minutes, so that large grains, i.e., >100 nm, may settle from the suspension, the suspension may be deposited onto the porous substrate by soaking and drying as described above for the second embodiment. The suspension may thereafter be allowed to dry, with the downstream surface of the substrate facing upwards, for about 30 minutes at 110° C. An advantage of using an oxide rather than, for instance, a chloride is that the final metal particle size is typically determined by the initial metal oxide particle size. Whereas, with the chemical reduction approach, the particles of, for instance, iron chloride melt before being reduced. As noted above, the drying time may range from about 10 minutes to about 60 minutes at temperatures ranging from about 10° C. to about 200° C. The substrate may thereafter be sealed to provide the assembled system, as provided above, and exposed to hydrogen at approximately 850° C. for about 30 minutes to chemically reduce the nanocrystallites to metal nanoparticles. Although 850° C. is used, temperature within a range of from about 350° C. to about 1000° C. may be applied.

In a fourth embodiment, a salt solution from organic salts, such as ferrous oxalate ($FeC_2O_4$), may be provided and deposited on to the substrate with methods and concentrations similar to those described for the second embodiment. For example, a 0.1 N aqueous solution of ferrous oxalate may be soaked into a porous substrate then allowed to dry, with the downstream surface facing upward, for 30 minutes at 100° C. Because this embodiment uses salts which can spontaneously decompose at elevated temperatures, the solvent should be evaporated from the substrate at temperatures between 0° C. and 120° C., and preferably at 100° C. The metal salt in this case does not require the presence of hydrogen to form the pure metal at elevated temperatures. In particular, metal particles can be spontaneously formed from salt particles, as the salt can spontaneously decompose to $CO_2$, $H_2O$, CO or similar gases upon heating the particles in a non-oxidizing atmosphere, usually to temperatures in a range between 100° C. and 500° C. The substrate may next be sealed to provide the assembled system, as provided above. Adding some hydrogen to the gas mixture may thereafter be used to remove any oxygen that may have leaked into the system. The catalyst particles are formed from the deposited salt particles by heating the porous substrate in hydrogen at 500° C. for about 30 minutes before the reaction is allowed to proceed.

It should be noted that some metal salts, such as sulfates and nitrates, also undergo spontaneous decomposition upon heating to elevated temperatures. However, these salts decompose to form metal oxides unless in the presence of a reducing atmosphere such as hydrogen. Accordingly, the use of chemicals such as ferrous sulfate and ferrous ammonium sulfate, may be implemented in accordance with the protocol set forth in the second embodiment rather than the protocol set forth in the fourth embodiment for catalyst particle formation.

Optimal nanostructure growth from the catalytic nanoparticles can be expected when gaseous supply of carbon can match the uptake of carbon by the catalytic nanoparticles. Accordingly, to enhance the uptake of carbon by the catalytic nanoparticles, for each of the embodiments set forth above, the concentration of nanoparticles provided across the downstream surface of the substrate should be such that sufficient spacing may be provided between the catalytic nanoparticles for effective diffusion of the gas between the nanoparticles.

To the extent that ferromagnetic catalyst nanoparticles, such as Fe, Ni, Co, or Fe3O4, are used, the application of a magnetic field greater than about 0.5 T in strength in the direction normal to the downstream surface of the porous substrate can be used to space the metallic particles substantially evenly across the porous substrate. Application of the magnetic field, in one embodiment, can induce a ferromagnetic alignment of the magnetic domains of each particle. The magnetic field from each particle can then exert a repulsive force on its neighboring particles to substantially evenly space and distribute the particles on the substrate.

Reaction Gas Supply

Figure 5:
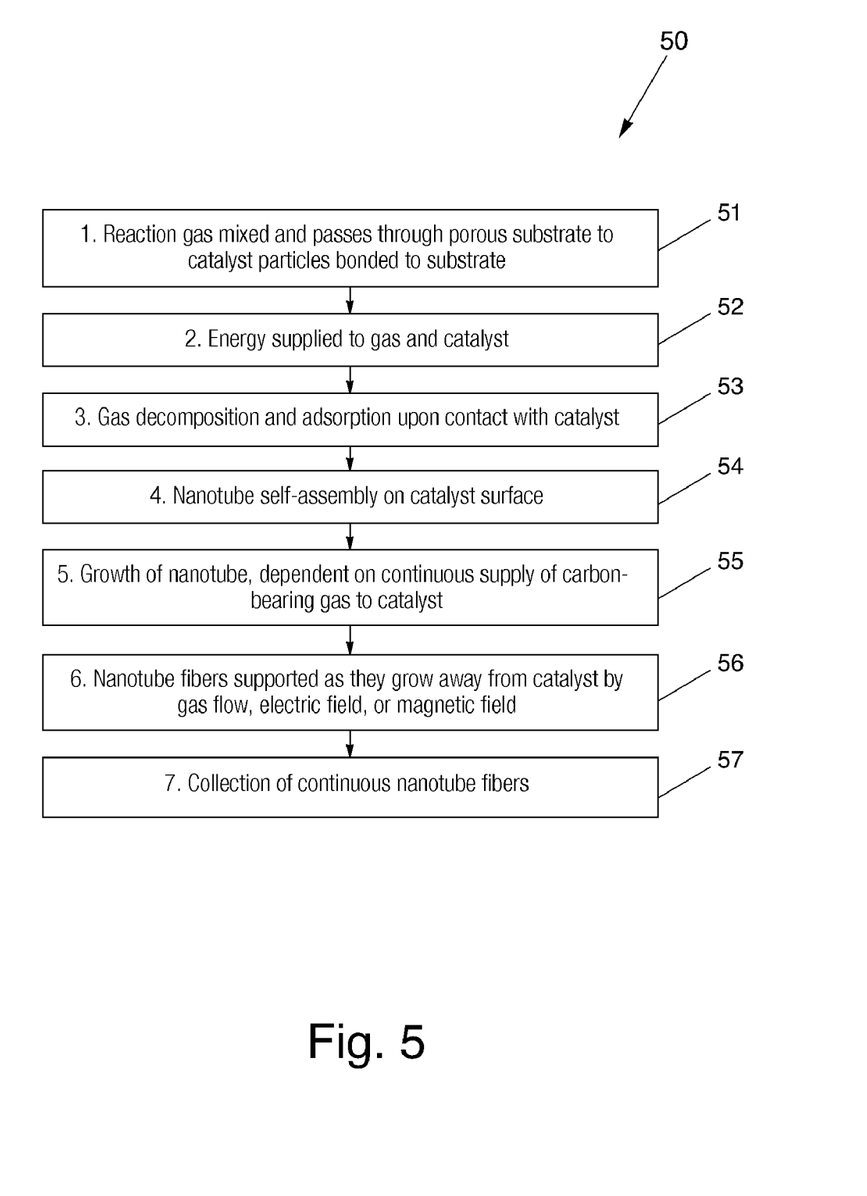
FIG. 5 illustrates a flow chart depicting, in accordance with one embodiment of the present invention, a process for synthesizing extended length nanostructures.

Referring now to FIG. 5, there is illustrated a flow chart of a process (50) for synthesizing nanotubes of extended length, in accordance with one embodiment of the present invention. For ease of discussion, reference will also be made to FIG. 1. Initially, a stream of reaction gas may be introduced into the system 10 by injecting the reaction gas through inlet 193 into tube 12, approximately 0.6 inches in diameter. To generate the reaction gas, in an embodiment, a mixture of approximately 19 mL/min of $H_2$ and 190 mL/min of an inert gas, such as He or Ar, may be introduced, at standard temperature and pressure, into a supply line feeding to the inlet 193. In addition, as the growth of carbon nanotubes requires that the reaction gas transport carbon to the growth site on the substrate, a carbon-containing source may also be injected into the supply line at a controlled rate and allowed to mix (51) with the $H_2$ and inert gas mixture, prior to being directed through the inlet 193.

Examples of suitable carbon-containing source include, ethanol, methane, methanol, acetylene, ethylene, xylene, carbon monoxide, toluene, and the like. Table I below lists the free energy of formation for some of these sources, which provides an index of stability.

TABLE I

Gases are ordered from most stable at top to most unstable at bottom

| Gas Type | Formula | Decomposition T (K)* | ΔG at 400 K (kJ/mol) | ΔG at 1300 K (kJ/mol) |
|---|---|---|---|---|
| Carbon Monoxide | CO | Stable at 400 < T < 1300 | −146 | −235 |
| Methanol | $CH_4O$ | 1350 | −149 | −8 |
| Ethanol | $C_2H_6O$ | 950 | −144 | 89 |
| Methane | $CH_4$ | 850 | −42 | 52 |
| Acetylene | $C_2H_2$ | Unstable at 400 < T < 1300 | 204 | 154 |
| Benzene | $C_6H_6$ | Unstable at 400 < T < 1300 | 147 | 319 |

*Defined here as the temperature where Gibbs' Free Energy (ΔG) transitions from negative to positive.

For the growth of extended length carbon nanotubes, the carbon-containing reaction gas must permeate through the porous substrate to reach the catalyst particles. Accordingly, the carbon-containing reactant introduced into the $H_2$ and inert gas mixture preferably selectively decomposes on the catalyst surface of the substrate, rather than in the gas phase. In one embodiment, if the carbon-containing source is in liquid form, the injection rate into the supply line may be controlled at approximately 10 mL/hour, while temperature at the point of injection may be maintained in a range of from about 50° C. to about 150° C. sufficient to vaporize the liquid source into a gas.

From Table I, carbon monoxide, methanol, ethanol and methane are particularly stable and lend themselves to catalytic decomposition on the substrates rather than in the gas phase. However, with safety issues associated with the use of carbon monoxide, it may be more desirable to use ethanol, methanol, or methane, even though they may be somewhat more unstable than carbon monoxide. Carbon-containing gases from lower down on the Table I, such as acetylene, on the other hand, tend to decompose in the gas phase. Decomposition in the gas phase, although potentially able to lead to the generation of carbon nanotubes, can also result in a significant amount of amorphous carbon deposited on the substrate and incorporated into the nanotubes during growth. Such a result can also lead to contamination of the growth sites.

In addition to the reaction gas, a mixture of evacuation gas may also be supplied to housing 11, approximately 1.75 inches in diameter and approximately 12 inches in length, of the system 10. To generate the evacuation gas, a mixture of $H_2$ and an inert gas, such as He or Ar, may be introduced, at standard temperature and pressure, into a supply line feeding to the inlet 194. In one embodiment, the evacuation gas may be introduced at a flow rate of from about 300 mL/min to about 500 mL/min into the housing 11 through inlet 194. The introduction an evacuation gas into housing 11 can act to displace and remove oxygen from within the housing 11. The introduction of evacuation gas into the housing 11 can also act to displace and remove, through exhaust port 195, reaction waste product exiting from tube 12. Accordingly, the flow rate of the evacuation gas should be sufficient greater than that of the reaction gas to carry the reaction gas toward exhaust port 195.

Energy Supply

Still referring to FIG. 5, once the carbon-containing gas has been directed through the inlet 193 and travels along tube 12 to the substrate 13, energy is required to decompose carbon-bearing molecules to constituent atoms and to enable diffusion of the carbon atoms to the catalyst particles and thereon. In one embodiment, thermal energy may be provided (52), at temperatures between about 500° C. and about 1400° C., by heating mechanism 17. Other mechanisms, including those that can supply conduction or convection radiation, frictional energy, visible light photons or other types of electromagnetic radiation, chemical energy, electrical energy, or electro-chemical energy, microwave radiation, eddy currents, ultrasound shock waves or compression, directly or indirectly to the catalyst, the substrate, or the gas may also be used.

Examples of various approaches to supplying energy for decomposition and diffusion of the carbon atoms to the catalyst particles and thereon include:

(1) thermally heating entire reaction chamber (i.e., tube 12), or only the catalyst particles, or just the porous substrate;

(2) using electromagnetic radiation to heat the catalyst particles via eddy currents, or tuning the electromagnetic radiation to the resonance frequency of the reacting gas to decompose the gas;

(3) directing ultrasound or pressure waves at the catalyst to provide energy; or (4) creating heat energy by chemical reactions at or near the catalyst particles, for example, a fraction of the supplied carbon can react locally to heat the substrate and/or the catalyst particles.

Reaction at Catalyst

When gas molecules pass close to a catalyst particle residing on the porous substrate, there exists an attractive force between the catalyst surface and the gas molecules. When the temperature is sufficiently high, >500° C., then the gas will thermally decompose (53). For example, for acetylene:

$$H_2C_2 \rightarrow 2\,H° + 2\,C$$

The atomic hydrogen, H°, resulting from this reaction may then react with another hydrogen atom to form $H_2$, or may diffuse on to the catalyst particle. At typical growth temperatures, hydride formation is not favored. The carbon molecule also may diffuse to the catalyst particle and subsequently thereon to a growth site. Because the diameter of the nanotubes approximately corresponds to the size of the particle, it is believed that after the particle becomes saturated, surface diffusion rather than bulk diffusion plays the more important role in nanotube growth. Since these catalyst particles are typically small, they may be single crystals or, at most, have only a few grains. Grain boundary diffusion of carbon in substrates with catalyst particles therefore may also be important in nanotube growth.

Nanostructure Formation and Growth

Surface diffusion proceeds, in the system of the present invention, until a carbon atom encounters other carbon atoms to form a cap on the catalyst particle surface (54). Growth can then proceed with new carbon atoms pushing this cap away from the particle and attaching rings of carbon to the cap until, for instance, a single wall carbon nanotube is formed. Single wall nanotubes tend to form on particles smaller than about 2 nm, whereas multiwall carbon nanotubes grow on larger particles, up to about 100 nm. A number of concentric sheaths can be built up to form a multiwall carbon nanotube whose length may be inherently limited only by the continued activity of the catalyst and mass transport of carbon. To continuously grow nanotubes during the synthesis process, the catalyst particles, in one embodiment, can be continuously exposed to the carbon-containing gas supply (55) so as to generate continuous fibers of nanotubes.

Means for Nanotube Support

As the nanotubes grow from the catalyst particles, the present invention provides, in one embodiment, physical support (56) to the nanotubes, which can contribute to the straightness of the nanotubes and to the ease of collection of the nanotubes subsequently. Physical support of growing nanotubes can be provided by the present invention through one or more of the following: forces from gas flow, electric fields, or magnetic fields.

In general, the flow of reaction gas through the substrate and past the growing nanotubes can provide mechanical support to the growing nanotubes by fluid drag. Specifically, the fluid drag from the gas flow can pull on the nanotubes to align the tubes substantially parallel to the direction of the gas flow.

In addition to this gas dynamic support, the nanotubes can be further supported during growth by an electrostatic field. Because, by nature, nanotubes are electrically conductive materials, they can develop a polarization when placed within an electric field. This polarization, as a result, can force alignment of the nanotubes in parallel to the electric field.

In connection with one embodiment of the present invention, a charge on an electrode upstream of substrate 13, such as electrode 14 in FIG. 1, and a second electrode downstream of substrate 12, such as electrode 15 in FIG. 1, may be implemented to create an electrostatic field. In particular, the downstream electrode closest to the growth surface of the substrate may be made positive, and a DC potential of from about 250V to about 5000V, and preferably about −465V, may be placed between the two electrodes. The magnitude of the field generated may be between about 5 kV/m and about 1000 kV/m, and typically 10 kV/m, depending on the pressure and concentration of the reaction gas. In some instances, the electrode closest to the growth surface may generate electrical discharges to the carbon nanotubes. These discharges may have the effect of enhancing growth, or allowing growth of uncapped nanotubes by ablation or etching of the nanotubes' hemispherical ends, thereby providing a site for the deposition of carbon radicals from the reaction gas. If, however, neither electrode is in contact with the carbon nanotubes, a reduced probability of electrical discharge due to field effects at highly curved surfaces, like the tips of the nanotubes, can allow stronger electric fields to be reached, thereby enhancing the robustness of the electric field support.

Nanotubes synthesized from a linear arrangement of the electrodes and substrate (FIG. 2), therefore, tend to extend substantially perpendicularly to the surface of the substrate when an electrostatic field is applied to the nanotubes in such a direction. Likewise, nanotubes synthesized from a concentric arrangement between the electrode and substrate (FIG. 4)

tend to grow radially relative to tube 42, and substantially perpendicularly relative to the surface of the substrate, when an electrostatic filed is applied to the nanotubes in such a direction.

Nanotubes are also magnetically anisotropic. As such, placement of the nanotubes within a magnetic field can cause the tubes to align in parallel to the flux lines of the field. For example, a magnetic field can be created by placing, for instance, a magnetic circuit having cobalt pole pieces about tube 12 of FIG. 1 adjacent to the substrate 13, such that the cobalt pole pieces may be on either side of the substrate to direct a magnetic field having a magnitude of between 0.1 and 20 T co-axial to the growth direction of the nanotubes. Alternatively, placing cobalt samarium permanent magnets close to the substrate can also create the required magnetic field. Use of ferromagnetic material such as Fe or Co to complete the magnetic circuit can also enhance the magnetic field direct at the substrate. However, these ferromagnetic materials should be shielded from contact with the reaction gas, as well as reaction temperatures greater than their Curie points.

Collection of Nanotubes

Once the nanotubes have grown to a desired length, they may be collected (57). Although nanotube growth may generally be in the same direction, the growth rate of nanotubes from the various catalyst particles may not be substantially uniform. Non-uniform growth can, therefore, create a problem when an attempt is made to collect, i.e. gather a multitude of nanotubes on a spool, bobbin, or drum, because the surface speed of the spool, bobbin or drum is approximately constant relative to the growth rate amongst the fibers. In addition, because carbon nanotubes exhibit only a few percent strain before fracture, attempts to stretch the slow-growing fibers may be insufficient. Accordingly, the nanotubes synthesized in accordance with the embodiments of the present invention may be collected, in one embodiment, as follows:

- Drum surface speed may be controlled to match the speed of the slowest-growing nanotubes.
- The bundle of nanotubes emanating from the substrate may be caused to wave in parallel to the drum axis with an amplitude sufficiently large to accommodate the fastest growing nanotubes on a sinuous path upon the drum surface. In particular, the slowest nanotubes may be laid down on circumferential loci, while the fastest growing nanotubes may be laid down on a sinuous locus of maximum amplitude. Moreover, as there may be little friction between the carbon nanotubes, there should be minimal entanglement, as the nanotubes sort out their appropriate loci.
- Electrostatic, magnetic, gas-dynamic or contact (e.g. from a waving deflector) forces can also be employed individually or in combination to cause the bundle of nanotubes to oscillate appropriately.
- Upon unwinding for use, nanotubes in the resultant tow can replicate their original growth rate, e.g. fast-growth ones will be sinuous in the tow. Methods well-known to the fabric industry should be able to compensate for this effect.
- In the case where the growth may be radial, a number of nanotubes fibers can be grouped together by a rotating, screw-like bail (i.e., electrode 44) to form a twisted yarn, as illustrated in FIG. 4. This bail can be simultaneously rotated and withdrawn to lead the yarn to an uptake reel. As noted above, in such an embodiment, the nanotubes can be guided by a set of rings on their way to a rotating bail.

Figure 6:
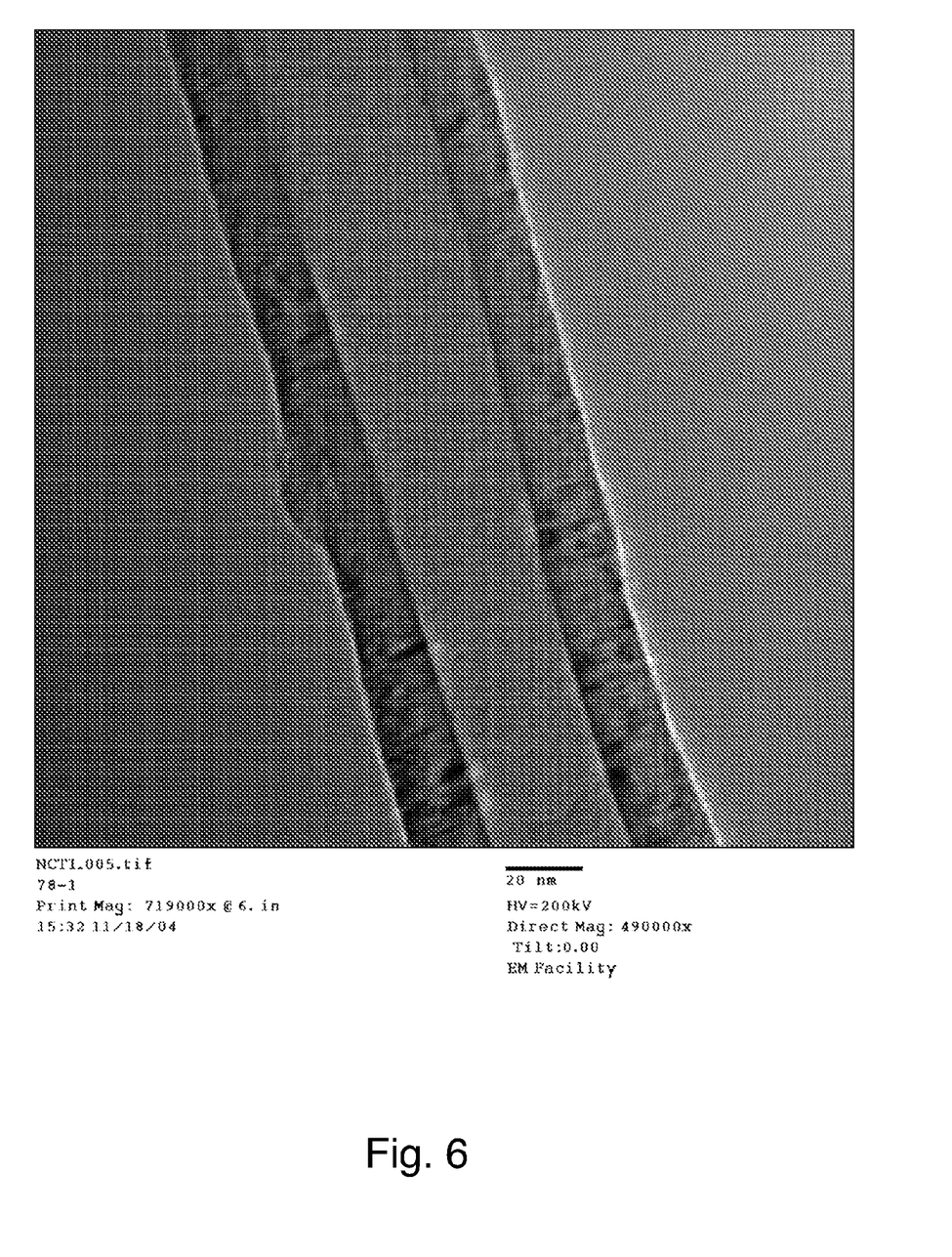
FIG. 6 illustrates a micrograph, obtained via transmission electron microscopy, of a nanotube synthesized in accordance with an embodiment of the present invention.

When a desired amount of extended length nanotubes has been synthesized, the supply of carbon-containing gas may be stopped and the heating mechanism turned off. In the present invention, nanotubes having a length of at least about 1 cm, and preferably of at least about 1 m can be grown. Of course, nanotubes substantially shorter in length can also be generated in accordance with an embodiment of the present invention. Once the temperature of the system falls to about 100° C., the gas supplies may be shut off. The resulting nanotubes can be examined for purity. An example of an extended length nanotube synthesized in accordance with embodiments of the present invention is illustrated in FIG. 6.

EXAMPLE II

The present invention provides, in another embodiment, a process for generating extended length prismatic structures. Prismatic structures, in on embodiment, can be an array of graphene planes joined to form a three dimensional lattice. The prismatic structures generated can have similar energy and carbon feedstock requirements as the reaction described above for the growth of carbon nanotubes. As such, the gas, energy and reaction conditions described above in connection with the growth of nanotubes also apply to the growth of prismatic carbon structures.

Catalyst Tiling for Prismatic Structures

Prismatic structures arise from the self-assembly of carbon on a different pattern of catalytic material than that used for formation of nanotubes. In accordance with one embodiment of the present invention, the nanotubes can be formed as carbon self-assembles around a catalyst 'particle' on a porous substrate. Prismatic structures, on the other hand, can be synthesized from formation of catalysts patterned in various shapes on a plate or non-porous surface. The patterns can subsequently enable the self-assembly of carbon atoms into complex shapes. For instance, if the catalyst is patterned in continuous lines that form a space-filling tiling across a plane, carbon atoms can be expected to assemble, off the catalytic "lattice" lines, into a graphene structure with a base pattern matching the catalyst pattern. Moreover, if a pattern or grid is created from a catalyst, such as iron, nickel or cobalt, so that the width of the continuous lines is relatively small, for instance, from about 0.2 nm to about 50 nm, and the distance of line spacing in the pattern is also relatively small, for example, from about 20 nm to about 500 nm, but preferably from about 2 nm to about 500 nm, then a prismatic structure may be grown normal to the plane on which the pattern lies and with the symmetry of the pattern. This symmetry can be three-fold (i.e., triangle), four-fold (i.e., square), six-fold (i.e., hexagon), rectangular, random, or in any of the many periodic or aperiodic tiling patterns, such as Kepler tilings or Penrose tilings.

Figure 7:
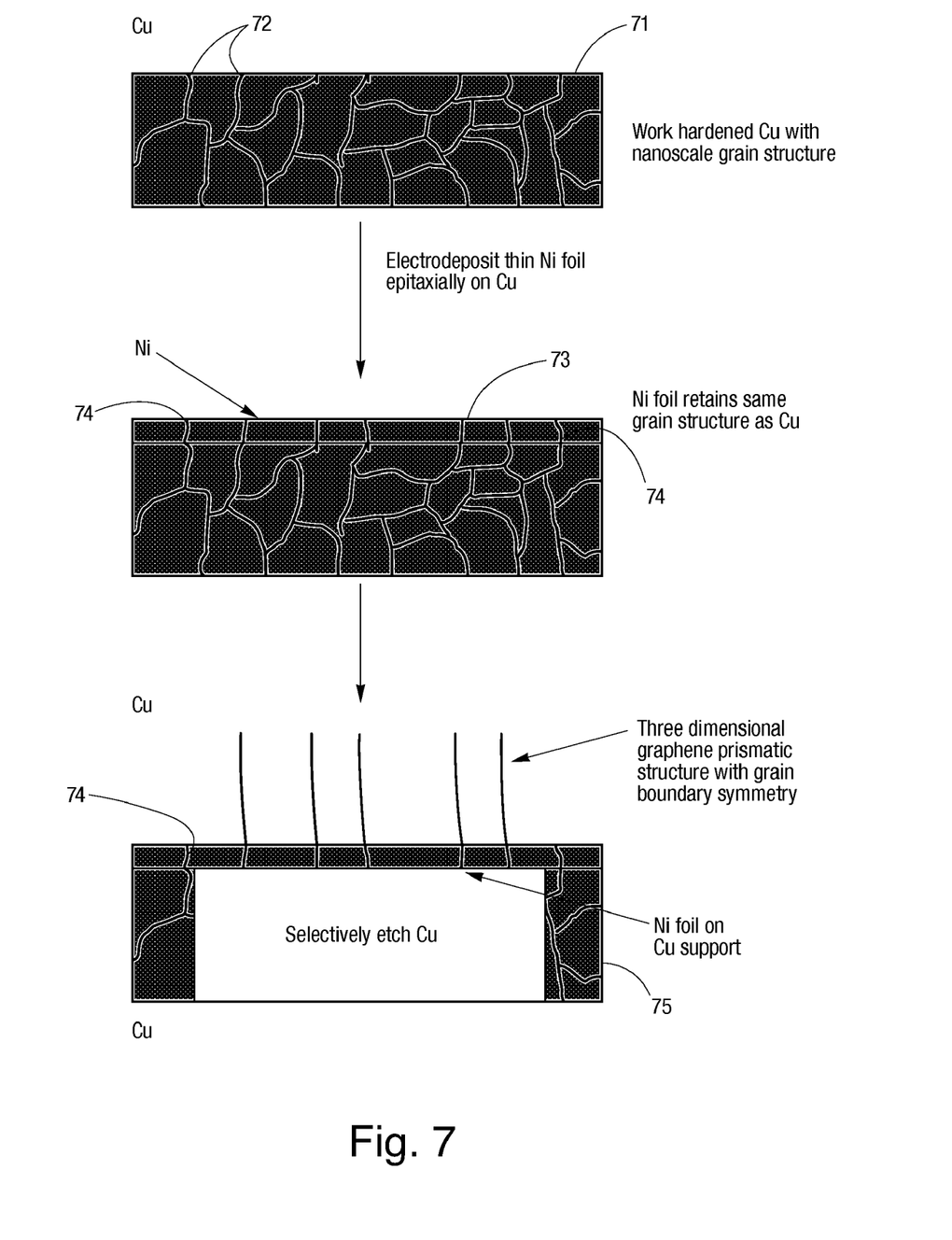
FIG. 7 illustrates a process for creating a template for synthesizing prismatic structures, in accordance with an embodiment of the present invention.

The geometry for this type of three dimensional grid or pattern can depend on the properties desired. Referring now to FIG. 7, there is illustrated, in accordance with one embodiment, a process whereby a template for growth of prismatic structures may be formed from a nickel membrane grown on copper (e.g., copper foil). Specifically, the copper 71 can be heavily work—hardened to make small grains 72. Next, a thin nickel foil 73 can be electrodeposited epitaxially on the copper 71 to form a substantially complementary crystal structure and grain boundary pattern 74 to the copper 71. The copper foil 71 can then be selectively dissolved from the nickel so that only a supporting ring 75 or structure is left. The nickel foil 73 will then have grain boundaries passing continuously from one side to the other, and though which carbon atoms can be transported preferentially. Carbon atoms may then form a random grain boundary-like structure with a similar pattern to that on the nickel foil grain boundary 73. Accordingly, by controlling the grain structure in the copper substrate, the nickel foil 73 can be made to pick up similar structure from which prismatic carbon patterns can be formed.

Another approach to designing geometric patterns for synthesis of prismatic structures may be to utilize self-assembly techniques (e.g. using biological elements such as proteins) to organize iron, nickel or cobalt atoms in the required patterns. An alternative approach to designing aperiodic patterns for formation of aperiodic structures may be to use direct atom placement, for instance, through the use of atomic force microscope probes.

Growth and Support of Prismatic Structures

As noted above, the gas, energy and reaction conditions described above in connection with the growth of nanotubes also apply to the growth of prismatic carbon structures. In addition, given that a continuous supply of reaction gas and reaction energy can be provided to the patterned catalysts, the length of the prismatic structure grown from the catalyst pattern can be continuous.

Moreover, as the prismatic structures can be three-dimensional lattices, these structures can be self-supporting. Accordingly, the use of a magnetic or electrostatic field for support may not be necessary.

Figure 8A:
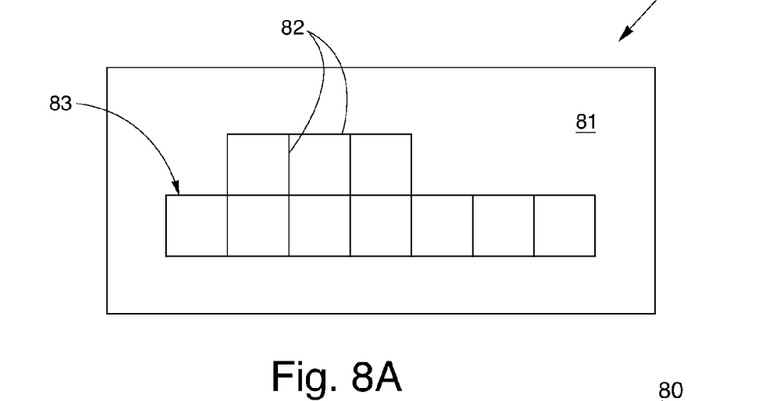
FIG. 8A illustrates a top view of a substrate having catalyst line patterns for synthesizing prismatic structures in accordance with one embodiment of the present invention.
Figure 8B:
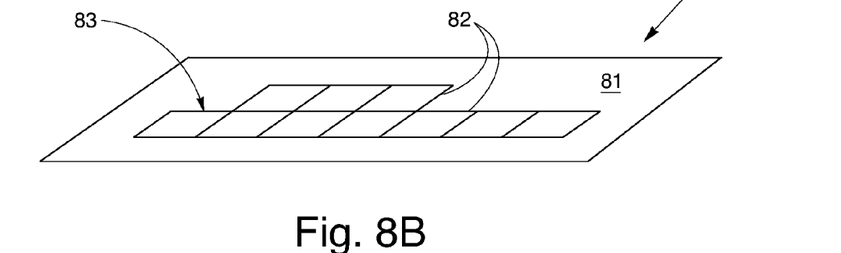
FIG. 8B illustrates a perspective view of the substrate and catalyst line patterns shown in FIG. 8A.

Referring now to FIGS. 8A-C, a substrate 80 having surface 81 is provided having a plurality of catalyst lines 82 forming a continuous designed pattern 83 (FIGS. 8A-B). It should be noted that a variety of periodic or aperiodic tiling arrangements can be used to form designed pattern 83. As illustrated, pattern 83 contains a tiling of squares across the surface 81.

In one embodiment, the substrate 80 may be made from a material non-reactive to carbon, such as alumina or silica, onto which lines 82 of catalyst material may be deposited in pattern 83.

In a second embodiment, the substrate 80 may be made from a catalytic material, such as nickel, iron, or cobalt, and an inert material, such as copper may mask the surface 81 except for the location of the catalyst lines 82.

In either case, the substrate 80 and surface 81 may be a continuous solid, or they may contain channels or pores in the spaces between the catalyst lines. Unlike the system described above for nanotube formation, a porous substrate is not a requirement for this system.

As described above, energy may be supplied to the substrate 80 or catalyst lines 82 through a number of mechanisms during the synthesis of the prismatic structure. If thermal energy is used, the catalyst lines 82 may be heated to a temperature between 500° C. and 1400° C. In addition, a carbon-containing reaction gas may be directed to the catalyst lines 82. In an embodiment where the surface 81 is non-porous, the reaction gas may be directed to the catalyst lines from an area above the surface 81. In an embodiment where the surface 81 is gas-permeable or contains pores (not shown), the reaction gas may be directed to the catalyst lines 82 through a surface opposite surface 81 of the substrate 80, such that the reaction gas exits through the surface 81.

Figure 8C:
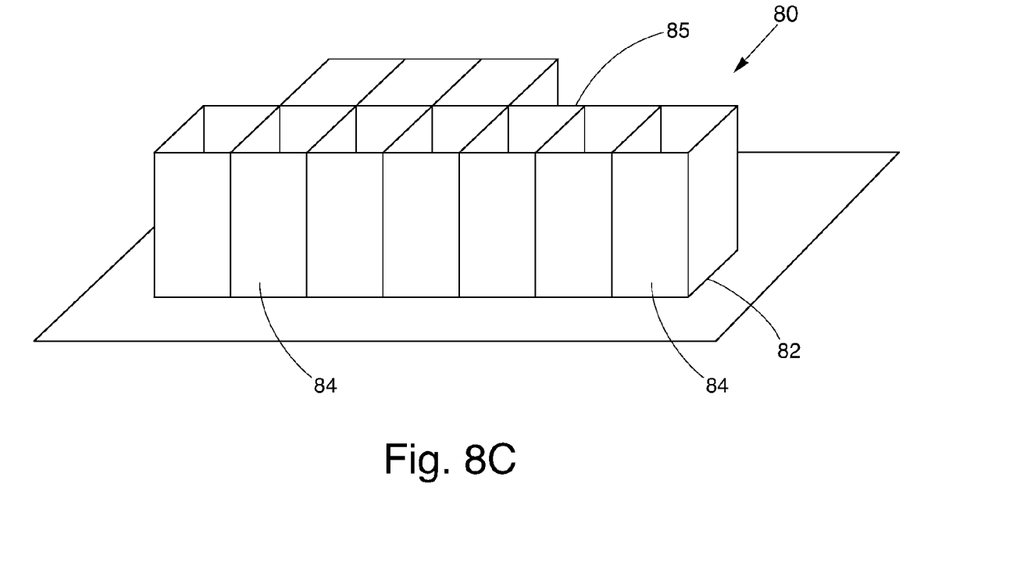
FIG. 8C illustrates a substrate having a prismatic structure grown from the catalyst line pattern shown in FIGS. 8A and 8B.

Looking now at FIG. 8C, carbon atoms from the reaction gas may self-assemble to form graphene planes 84 that grow from the catalyst lines 82 of pattern 83 substantially perpendicularly to surface 81. Where catalyst lines 82 intersect will lead to the formation of junctions between graphene planes 84. An array of joined graphene planes 84 can grow from the catalyst lines 82 to form a prismatic structure 85.

In an alternate embodiment, the surface 81 may be a nickel membrane, and the designed pattern 83 may include boundaries between crystalline grains, such as grain boundary pattern 74 in FIG. 7. In such an embodiment, carbon may diffuse preferentially on the grain boundaries from an opposite surface of the nickel membrane, such that the carbon exits from surface 81 preferentially via pattern 83. Self-assembly of graphene planes 84 proceeds as carbon exits from the grain boundaries represented by pattern 83, with junctions between the planes 84 assembled at the intersection between grain boundaries.

Applications

The production of extended length nanotubes and other nanostructures enables applications that utilize their extraordinary mechanical and electronic properties. The nanotubes and nanostructures produced by the systems and methods of the present invention can be woven or assembled into a fibrous material and treated for use in connection with various applications, including heat sinks, electric power transmission lines which require strength and conductivity, electric motor and solenoid windings which require low resistivity and minimum eddy current loss, high strength fiber-reinforced composites including carbon-carbon and carbon-epoxy, and nanotube-based cables, fibers, tows, textiles, and fabrics. Also included are devices made from these nanotubes and nanostructures, and textiles such as armor of various types, protective clothing, energy-generating tethers and the like. The present invention also contemplates coating individual nanotubes or groups of nanotubes with either a thermoset epoxy or a high-carbon polymer, such as furfuryl alcohol or RESOL to act as a composite precursor.

Structures formed from carbon have been discussed herein. However, it should be recognized that nanostructures, including nanotubes, can be formed from other materials, including for example, boron nitride, tungsten sulfide, vanadium oxide, and boron carbon nitride using catalytic processes similar to that described above. Accordingly, the present invention also includes extended length nanotubes and prismatic nanostructures formed from inorganic materials such as vanadium oxide and boron nitride, and from carbon in combination with other elements, such as boron carbon nitride. Although the systems and processes of the present invention is capable of making extended length nanostructures, the systems and processes of the present invention may also be capable of generating nanostructures of relatively short length. Furthermore, the present invention includes the process for making related nanostructured materials and the structural, thermal, and electrical applications described above.

While the invention has been described in connection with the specific embodiments thereof, it will be understood that it is capable of further modification. Furthermore, this application is intended to cover any variations, uses, or adaptations of the invention, including such departures from the present disclosure as come within known or customary practice in the art to which the invention pertains, and as fall within the scope of the appended claims.

What is claimed is:

1. A method for synthesizing nanostructures, the method comprising:
   providing a porous substrate having an upstream surface and a downstream surface;
   depositing a plurality of catalyst particles onto the downstream surface of the substrate;

directing a flow of a reaction gas across the upstream surface and through the downstream surface of the substrate;

decomposing the reaction gas about the catalyst particles to generate constituent atoms;

allowing for diffusion of the constituent atoms to the catalyst particles and thereon for the synthesis of nanostructures therefrom.

2. A method as set forth in claim 1, wherein, in the step of providing, the substrate is made from a material including carbon foams, glassy carbon, silica, alumina, alumina coated with silica, zirconia, zeolites, sintered titanium, titania, magnesia, yttria, copper, iron, iron nickel, iron cobalt, cobalt, steel, iron carbide, nickel, cobalt, or a combination thereof.

3. A method as set forth in claim 1, wherein the step of depositing includes depositing the particles directly onto the substrate by one of, precipitation of the particles solution, ball milling, sputtering, electrochemical reduction, or atomization.

4. A method as set forth in claim 1, wherein, in the step of depositing, the catalyst particles are made from one of iron, nickel, cobalt, iron oxides, nickel oxides, cobalt oxides, metal salts with sulfate, metal salts with sulfamates, acetate, oxalates, nitrites, nitrates, or a combination thereof.

5. A method as set forth in claim 1, wherein the step of directing includes allowing the gas, after exiting the downstream surface of the substrate, to flow past growing nanostructures, so as to provide support to the growing nanostructures.

6. A method as set forth in claim 1, wherein the step of directing includes adding a carbon-containing source to the reaction gas prior to directing the reaction gas to the substrate.

7. A method as set forth in claim 6, wherein, in the step of adding, the carbon-containing source includes ethanol, methane, methanol, ethylene, acetylene, xylene, carbon monoxide, or toluene.

8. A method as set forth in claim 1, wherein the step of decomposing includes generating energy to temperatures ranging from about 500° C. to about 1400° C.

9. A method as set forth in claim 8, wherein, in the step of generating, the energy includes thermal energy, frictional energy, visible light photons or other types of electromagnetic radiation, chemical, electrical, or electrochemical energy, microwave radiation, eddy currents, or ultrasound shock waves or compression.

10. A method as set forth in claim 1, wherein the step of allowing includes growing the nanostructures in a direction substantially parallel to the flow of reaction gas.

11. A method as set forth in claim 1, further including generating an electrostatic field having a strength between about 5 kV/m and about 1000 kV/m to provide support the nanostructures as they grow from the substrate, so as to contribute to the straightness of the nanostructures.

12. A method as set forth in claim 1, further including generating a magnetic field having a magnitude between about 0.1 T and about 20 T to provide support the nanostructures as they grow from the substrate, so as to contribute to the straightness of the nanostructures.

13. A process for packing of carbon nanotubes comprising:

generating nanotubes by providing a porous substrate having an upstream surface and a downstream surface, depositing a plurality of catalyst particles onto the downstream surface of the substrate, directing a flow of a reaction gas across the upstream surface and through the downstream surface of the substrate, decomposing the reaction gas about the catalyst particles to generate constituent atoms, and allowing for diffusion of the constituent atoms to the catalyst particles and thereon for the synthesis of nanotubes therefrom;

coating the nanotubes with one of furfuryl alcohol, epoxy resin, or Resol; and arranging the coated nanotubes in bundles for packing.

14. A method as set forth in claim 1, wherein the step of providing includes generating a substrate sufficiently porous so that a pressure difference between the upstream surface and the downstream surface can be substantially low, so as to permit the body to maintain its structural integrity as the reaction gas flows therethrough.

15. A method as set forth in claim 1, wherein, in the step of providing, the substrate is one of foam, channel plate, felt, wool, fibers, cloth, array of needles.

16. A method as set forth in claim 1, wherein the step of depositing includes chemical reduction of metallic salts deposited from solution and dried on to the substrate.

17. A method as set forth in claim 1, wherein the step of depositing includes reduction of particles deposited from suspension and dried on to the substrate.

18. A method as set forth in claim 1, wherein the step of depositing includes thermal reduction of metallic salts deposited from solution and dried on to the substrate.

19. A method as set forth in claim 1, wherein the step of depositing includes distributing the catalyst particles substantially evenly across the downstream surface of the substrate.

20. A method as set forth in claim 4, wherein, for the ferromagnetic particles, the step of depositing includes applying a magnetic field greater than about 0.5 T in strength in the direction normal to the downstream surface of the porous substrate to space the ferromagnetic particles substantially evenly across the porous substrate.

21. A method as set forth in claim 1, wherein, in the step of depositing, the catalyst particles range from about 1 nm to about 50 nm in size.

22. A method as set forth in claim 1, wherein the step of directing includes controlling rate of flow of the reaction gas.

23. A method as set forth in claim 1, further including introducing an evacuation gas to displace and remove reaction waste product.

24. A method as set forth in claim 1, wherein the step of allowing includes growing the nanostructures in a direction substantially radially to the flow of reaction gas.

25. A method as set forth in claim 1, wherein the step of allowing includes growing the nanostructures to a specified length.

26. A method as set forth in claim 25, wherein, in the step of growing, the specified length at least about 1 cm.

27. A method as set forth in claim 25, wherein, in the step of growing, the specified length at least about 1 m.

28. A method as set forth in claim 1, further including collecting the nanostructures once the nanostructures have grown to a desired length.

* * * * *